(12) United States Patent
Hu et al.

(10) Patent No.: US 12,520,083 B1
(45) Date of Patent: Jan. 6, 2026

(54) COMPOSITE MATERIAL FOR ACOUSTIC TRANSDUCER DIAPHRAGM

(71) Applicant: ORA GRAPHENE AUDIO INC., Montréal (CA)

(72) Inventors: Kaiwen Hu, Montreal (CA); Robert-Eric Gaskell, Montreal (CA); Jude Joseph Habib, Montreal (CA)

(73) Assignee: ORA GRAPHENE AUDIO INC., Montreal (CA)

( * ) Notice: Subject to any disclaimer, the term of this patent is extended or adjusted under 35 U.S.C. 154(b) by 0 days.

(21) Appl. No.: 19/248,541

(22) Filed: Jun. 25, 2025

Related U.S. Application Data (60) Provisional application No. 63/763,999, filed on Feb. 27, 2025.

(51) Int. Cl.
| | |
|---|---|
| *H04R 7/12* | (2006.01) |
| *H04R 7/04* | (2006.01) |
| *H04R 9/06* | (2006.01) |
| *H04R 11/02* | (2006.01) |

(Continued)

(52) U.S. Cl.
CPC .............. *H04R 7/127* (2013.01); *H04R 7/04* (2013.01); *H04R 9/06* (2013.01); *H04R 11/02* (2013.01); *H04R 19/02* (2013.01); *H04R 31/003* (2013.01); *H04R 2201/003* (2013.01); *H04R 2307/021* (2013.01); *H04R 2307/023* (2013.01); *H04R 2307/025* (2013.01); *H04R 2307/027* (2013.01); *H04R 2307/029* (2013.01)

(58) Field of Classification Search
CPC ........ H04R 2307/025; H04R 2307/023; H04R 2307/027; H04R 2201/003
See application file for complete search history.

(56) References Cited

U.S. PATENT DOCUMENTS

2017/0006382 A1* 1/2017 Luzzato .................... H04R 7/20

FOREIGN PATENT DOCUMENTS

| | | | | |
|---|---|---|---|---|
| CN | 111267411 A | * | 6/2020 | ............. B32B 27/36 |
| WO | WO-2022160942 A1 | * | 8/2022 | ........... H04R 31/003 |

* cited by examiner

*Primary Examiner* — Sunita Joshi
(74) *Attorney, Agent, or Firm* — John Jahchan; NORTON ROSE FULBRIGHT CANADA LLP (57) ABSTRACT

There is a composite material for an acoustic transducer diaphragm comprising: a thermoplastic polymer resin, a graphitic filler, and optionally a coupling agent. The thermoplastic polymer resin is selected from the group consisting of polypropylene, polyethylene, poly(methyl methacrylate), polycarbonate, polyoxymethylene, cyclic olefin copolymer, polyethylene terephthalate, acrylonitrile butadiene styrene, polybutylene terephthalate, polyamide, poly (ADP-ribose) polymerase, polyethylenimine, polyamide-imide, polyether ether ketone, polyolefin, polyester, polycarbonate, polysulfone, polyacetals, polyvinyl acetals, polyketone, polyamides, cyclic olefin copolymer, thermoplastic thermotropic liquid-crystal polymer, polyphenylene sulfide, polyimide and a mixture thereof. The graphitic filler is selected from the group consisting of graphene oxide, reduced graphene oxide, graphite, graphene and carbon nanotubes, and a mixture thereof. The coupling agent or a mixture is selected from the group consisting of titanium organometallics, aluminum organometallics, zirconium organometallics, and silicon organometallics.

19 Claims, 5 Drawing Sheets

(51) Int. Cl.
*H04R 19/02* (2006.01)
*H04R 31/00* (2006.01)

COMPOSITE MATERIAL FOR ACOUSTIC TRANSDUCER DIAPHRAGM

CROSS-REFERENCE TO A RELATED APPLICATION

This disclosure claims priority from U.S. provisional application No. 63/763,999 filed on Feb. 27, 2025, the contents of which are incorporated herein by reference in its entirety.

TECHNICAL FIELD

This disclosure relates to the field of acoustic transducers and more particularly to composite materials for acoustic transducer diaphragms.

BACKGROUND OF THE ART

Microphones generally use electromagnetic induction (dynamic microphones), capacitance change (condenser microphones) or piezoelectricity (piezoelectric microphones) to produce an electrical signal from air pressure variations. Microphones are typically used in conjunction with a preamplifier before the signal can be amplified with an audio power amplifier for use and/or recording.

Acoustic transducer diaphragms are used in microphones and speakers to record or to emit sound waves. Microphones generally use electromagnetic induction (dynamic microphones), capacitance change (condenser microphones) or piezoelectricity (piezoelectric microphones) to produce an electrical signal from air pressure variations. Microphones are also typically used in conjunction with a preamplifier before the signal can be amplified with an audio power amplifier for use and/or recording.

Dynamic transducers are electro-acoustic transducers such as loudspeakers and microphones that operate on the principle of induction. The most common dynamic microphones today are moving-coil microphones that exploit a small movable induction coil, positioned in the magnetic field of a permanent magnet, which is attached to the diaphragm. When the diaphragm vibrates under an acoustic stimulus then the coil moves in the magnetic field, producing a varying current in the coil through electromagnetic induction. A single dynamic membrane does not respond linearly to all audio frequencies and accordingly some dynamic microphones exploit multiple membranes for the different parts of the audio spectrum and then combine the resulting signals. Combining the multiple signals correctly is difficult and designs that do this tend to be expensive whilst some other designs are more specifically aimed towards isolated parts of the audio spectrum.

A speaker, also known as a loudspeaker or loud-speaker, produces sound in response to an electrical signal input. The most common speaker used today is the dynamic speaker which operates on the same basic principle as a dynamic microphone, but in reverse, in order to produce sound from an electrical signal. When an alternating current electrical audio signal input is applied through the voice coil, a coil of wire suspended in a circular gap between the poles of a permanent magnet, the coil is forced to move rapidly back and forth due to Faraday's law of induction, which causes a paper cone attached to the coil to move back and forth, pushing on the air to create sound waves.

Accordingly, the acoustic performance of microphones and speakers is tied to their acoustic diaphragm. Thus, to improve the performance of microphones and speakers it would be desirable to have improved acoustic diaphragms.

SUMMARY

In a first aspect of the present disclosure, there is provided a composite material for an acoustic transducer diaphragm comprising:
  a thermoplastic polymer resin selected from the group consisting of polypropylene, polyethylene, poly(methyl methacrylate), polycarbonate, polyoxymethylene, cyclic olefin copolymer, polyethylene terephthalate, acrylonitrile butadiene styrene, polybutylene terephthalate, polyamide, poly(ADP-ribose) polymerase, polyethylenimine, polyamide-imide, polyether ether ketone, polyolefin, polyester, polycarbonate, polysulfone, polyacetals, polyvinyl acetals, polyketone, polyamides, cyclic olefin copolymer, thermoplastic thermotropic liquid-crystal polymer, polyphenylene sulfide, polyimide and a mixture thereof;
  a graphitic filler selected from the group consisting of graphene oxide, reduced graphene oxide, graphite, graphene and carbon nanotubes, and a mixture thereof; and
  optionally a coupling agent or a mixture of selected from the group consisting of titanium organometallics, aluminum organometallics, zirconium organometallics, and silicon organometallics.

In at least some embodiments of the first aspect, the coupling agent is present in a concentration of at least 0.5 wt. %.

In at least some embodiments of the first aspect, the coupling agent has a chemical structure being $(R)_x\text{-}M_y\text{-}(R')_z$, wherein M is selected from silicon, titanium, aluminum, zirconium or a combination thereof, R is a filler binding functional group, R' is a resin binding functional group, and the values of x, y, and z are defined as $1 \leq x \leq 20$, $0 \leq y \leq 6$ and $1 \leq z \leq 20$ In at least some embodiments of the first aspect, the graphitic filler is provided in a weight ratio of the graphitic filler to thermoplastic resin of between 1:99 to 9:1.

In at least some embodiments of the first aspect, the graphitic filler is provided in a weight ratio of the graphitic filler to the coupling agent of between 200:1 to 2:1.

In at least some embodiments of the first aspect, the composite material further comprises additional fillers selected from carbon fibers, cellulose fibers, mineral clays, glass fibers and combinations thereof.

In at least some embodiments of the first aspect, the additional fillers are provided in a concentration of up to 40 wt. % of the total weight of the composite material.

In at least some embodiments of the first aspect, the composite material has a shape selected from:
  a truncated cone shape or an inverted truncated cone shape,
  a planar shape,
  a dome shape or an inverted dome shape,
  a centrally domed portion surrounded by a curved edge portion,
  a centrally domed portion surrounded by a planar edge portion, or
  an upper or lower domed portion and an upper or lower cylindrical portion In at least some embodiments of the first aspect, ribs or striations are present on the composite material.

In at least some embodiments of the first aspect, the composite material has a speed of sound between about 1500 m/s to 10,000 m/s and internal loss factor between 0.001 to 0.5.

In at least some embodiments of the first aspect, the composite material has a speed of sound between about 2500 m/s to 7500 m/s and internal loss factor between 0.01 to 0.2.

In at least some embodiments of the first aspect, the composite material has a 0% to 50% difference in speed of sound between machine direction and transverse direction.

In a second aspect of the present disclosure, there is provided a method of forming the composite material as defined herein into a shape as defined above, the method comprising thermoforming the composite material into a predetermined shape selected from the shapes listed above. In at least some embodiments, the thermoforming is die forming, pneumatic forming, vacuum forming and/or a combination thereof.

In a third aspect of the present disclosure, there is provided an acoustic transducer such as a loudspeaker or a microphone comprising the composite material as defined herein.

In at least some embodiments of the third aspect, the microphone is dynamic with an operating frequency range between 10 Hz to 50 KHz.

In at least some embodiments of the third aspect, the loudspeaker is a dynamic tweeter with an operating frequency range between 300 Hz to 50 KHz.

In at least some embodiments of the third aspect, the loudspeaker is a MEMS speaker with an operating frequency range between 10 Hz to 100 KHz.

In at least some embodiments of the third aspect, the loudspeaker is a balanced armature speaker with an operating frequency range between 10 Hz to 100 KHz.

In at least some embodiments of the third aspect, the loudspeaker is electrostatic with an operating frequency range between 10 Hz to 100 KHz.

Many further features and combinations thereof concerning the present improvements will appear to those skilled in the art following a reading of the instant disclosure.

DETAILED DESCRIPTION

There is provided composite materials for acoustic diaphragms also known as acoustic membranes. The present composite material comprises a thermoplastic polymer resin, a graphitic filler and preferably a coupling agent selected from the group consisting of titanium organometallics, aluminum organometallics, zirconium organometallics, and silicon organometallics. It was presently found that the combination of thermoplastic polymers and a graphitic filler improves the performance and cost-effectiveness of acoustic diaphragms. Furthermore, it was found that the addition of the coupling agents defined herein improved the acoustic properties of the membrane.

The coupling agents are reactive molecules which react chemically or physically either with a filler/fiber and/or the polymer matrix and thus improve the adhesion between the components of the composite material. In at least some embodiments, the present coupling agent have a chemical structure of $(R)_x-M_y-(R')_z$, where M is selected from silicon, titanium, aluminum, zirconium or a combination thereof, R is a filler binding functional group, and R' is a resin binding functional group. The values of x, y, and z are defined as $1 \leq x \leq 20$, $0 \leq y \leq 6$ and $1 \leq z \leq 20$. In some embodiments, R is selected from one of alkoxy, carbonyl, carboxyl, acyloxy, acylamino, alkyleneoxy and alkyleneoxycarboxyl. In at least some embodiments, R' is selected from vinyl, aliphatic epoxyalkyl, styryl, methacryloxy, acryloxy, aliphatic amino, chloropropyl, aliphatic mercapto, aliphatic sulfonium group, isocyanato, aliphatic urea group, aliphatic carboxyl, aliphatic hydroxyl, cyclohexyl, phenyl, aliphatic formyl, acetyl and benzoyl.

The term "graphitic material" as used herein refers to a material selected from one or more of graphene, graphite, graphene oxide, graphite oxide, reduced graphene oxide and reduced graphite oxide. The term "graphitic oxide material" as used herein refers to a material selected from one or more of graphene oxide, graphite oxide, reduced graphene oxide and reduced graphite oxide. For example, graphitic materials include graphene oxide, graphite, reduced graphene oxide, graphene powder, graphene nanoplatelets, graphene nanosheets, single walled carbon nanotubes (SWCNT), multiwall carbon nanotubes (MWCNT) as well as their functionalized counterparts and mixtures thereof.

Graphite is a crystalline form of carbon formed of a stack of 2D lattices of $sp^2$-hybridized carbon organized in a hexagonal structure. In its thinnest expression, a single layer of the hexagonal structure of graphite is referred to as graphene. Depending on the context, structures having up to 10, and even in some cases up to one hundred layers of the hexagonal structure can continue to be referred to as graphene, and the frontier between graphite and graphene can thus be fuzzy. In this specification, structures having up to 10 layers of graphene will be referred to as graphene, and structures having more than 10 layers of graphene will be referred to as graphite. Likely due to the thickness distinction between the two, it is common to refer to particles of graphite as "flakes" and to particles of graphene as "sheets". Accordingly, in some embodiments, the composite material comprises a plurality of mono and/or multilayers of graphene. In some embodiments, the composite material comprises a plurality of mono and/or multilayers of graphite.

Graphene is a material that has polyaromatic carbon materials comprising a polyaromatic fused ring system that are primarily produced by mechanical, liquid, chemical exfoliation or a combination thereof of graphitic materials such as natural graphite, synthetic graphite and carbon fibers. Alternatively, polyaromatic carbon materials can also be produced by other approaches such as carbonization of organics, chemical vapor deposition (CVD) or plasma methods.

Graphite oxide is a compound of carbon, oxygen and hydrogen in variable ratios. The carbon mass percentage is commonly around 45% and the typical atomic carbon to oxygen ratio can be between 1.8 and 2.9. The native functional groups on graphite oxide include hydroxyls, epoxides, carbonyls, carboxylic acids and organosulfates. Graphene oxide is also a compound of carbon, oxygen and hydrogen in similar ratios to graphite oxide, given the similarity between the materials. Graphene oxide materials have a polyaromatic fused ring system with a typical carbon to oxygen atomic ratio between 0.5 and 4. They are produced by chemical or electrochemical oxidation of graphitic materials such as natural graphite, synthetic graphite and carbon fibers.

Reduced graphite oxide, and reduced graphene oxide are similar to their graphite oxide and graphene oxide counterparts, except for the fact that they have gained electrons (i.e. they exhibit a decrease in their oxidation state) which is typically achieved by chemical, thermal, photo, hydrothermal reduction or combination of different categories of reduction. The maximal reduction of graphene oxide leads to graphene, whereas the maximal reduction of graphite oxide leads to graphite.

The term "carbon nanotubes" as used herein includes "single walled carbon nanotubes" (SWCNT) and "multiwall carbon nanotubes" (MWCNT). SWCNTs are a two dimensional graphene sheet that has the shape of a hollow cylinder. MWCNTs are multiple nested SWCNTs that form the shape of concentric tubes.

Chemically functionalized graphitic materials are those, which are chemically modified to bear non-native chemical groups through covalent bonding or non-covalent bonding such as TT-TT interaction. It is contemplated herein that the graphitic materials described above can be chemically functionalized.

The composite material contains a thermoplastic polymer resin which is selected from the group consisting of polypropylene, polyethylene, poly(methyl methacrylate), polycarbonate, polyoxymethylene, cyclic olefin copolymer, polyethylene terephthalate, acrylonitrile butadiene styrene, polybutylene terephthalate, polyamide, poly(ADP-ribose) polymerase, polyethylenimine, polyamide-imide, polyether ether ketone, polyolefin, polyester, polycarbonate, polysulfone, polyacetals, polyvinyl acetals, polyketone, polyamides, cyclic olefin copolymer, thermoplastic thermotropic liquid-crystal polymer, polyphenylene sulfide, polyimide and a mixture thereof.

The present composite material which includes graphitic materials and thermoplastic polymers has the advantage of being a cheaper material compared to traditional acoustic diaphragm which are metallic. Moreover, the present material has improved acoustic properties particularly with the addition of the coupling agent as demonstrated in the Example section below (an increase in resonance frequency, a narrower variation around the resonance frequency and improved mixing effect between the graphitic material and the thermoplastic polymer). Nevertheless, the performance without the coupling agents is still an improvement in terms of properties compared to traditional acoustic membranes and particularly the cost of fabrication to each similar or better properties.

In at least some embodiments, the composite material comprises the graphitic materials in a concentration of from 20 to 50 wt. % and the thermoplastic resin in a concentration of from 40 to 80 wt. %. The graphitic material is provided in a weight ratio of the graphitic material to thermoplastic resin of between 1:99 and 9:1, between 1:50 and 9:1, between 1:30 and 9:1, between 1:20 and 9:1, between 1:15 and 9:1, between 1:9 and 9:1, between 1:9 and 3:1, or between 1:9 and 2:1. In the composite material, the graphitic material is a filler and is therefore known herein as a "graphitic filler". In at least some embodiments, the graphitic filler is provided in a weight ratio of the graphitic filler to the coupling agent of between 200:1 and 2:1, or between 50:1 and 2:1. In at least some embodiments, the composite material comprises at least 0.5 wt. %, at least 1 wt. %, at least 2 wt. %, at least 5 wt. %, or at least 10 wt. % of the coupling agent.

Optionally, the composite material includes an addition of additional fiber fillers selected from carbon fibers, cellulose fibers, microfibrillated cellulose, nanofibrillated cellulose, and glass fiber. The additional fiber fillers can be provided in a concentration of up to 40 wt. %, up to 35 wt. %, up to 30 wt. %, up to 25 wt. %, up to 20 wt. %, for example from 1 to 40 wt. %, from 1 to 30 wt. %, from 1 to 20 wt. %, from 5 to 40 wt. %, from 5 to 30 wt. %, from 5 to 20 wt. %, or from 5 to 15 wt. %.

An "acoustic transducer" as used herein and throughout this disclosure, refers to a component, device, or element within device or system for converting electrical signals to acoustic signals which are propagated within a medium and/or for converting acoustic signals propagating within a medium into electrical signals. Such acoustic transducers may include, but are not limited to, microphones and loudspeakers forming part of a portable electronic device (PED), portable electronic device (FED), wearable devices, and other devices such as headphones, for example. The composite material of the present disclosure can be used as a membrane in the acoustic transducers.

The acoustic transducer can have membranes of a variety of shapes. The composite material can therefore be shaped into a curved membrane or substantially flat membrane. The shape of the membranes is manipulated, during the manufacturing process, to comply with the intended application. The membranes can be made to a variety of thicknesses. In some embodiments, multiple membranes are stacked and subsequently bonded together to form one membrane with an overall thickness greater than the individual membranes it is composed of.

Figure 1A:
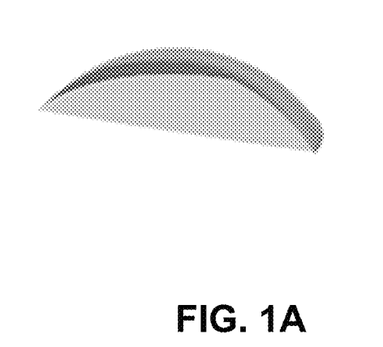
FIG. 1A is a cross section of a dome shaped acoustic diaphragm.
Figure 1B:
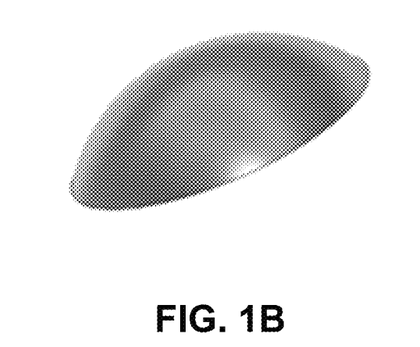
FIG. 1B is an elevation view of a dome shaped acoustic diaphragm.
Figure 1C:
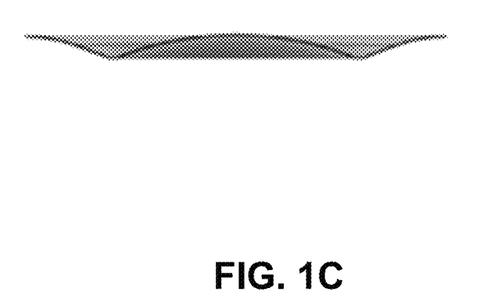
FIG. 1C is a cross section of an acoustic diaphragm having the shape of a central dome with edges.
Figure 1D:
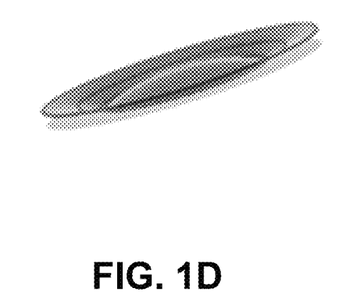
FIG. 1D is an elevation view of an acoustic diaphragm having the shape of a central dome with edges.
Figure 1E:
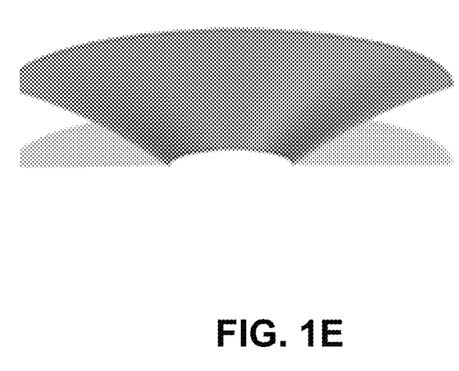
FIG. 1E is a cross section of a truncated cone shaped acoustic diaphragm.
Figure 1F:
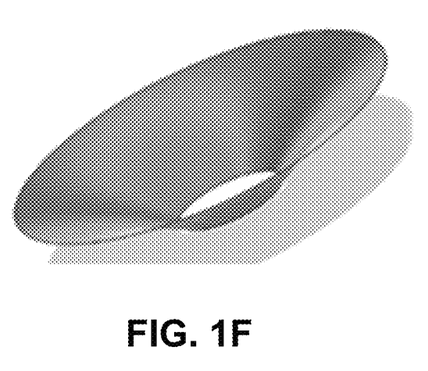
FIG. 1F is an elevation view of a truncated cone shaped acoustic diaphragm.
Figure 1G:
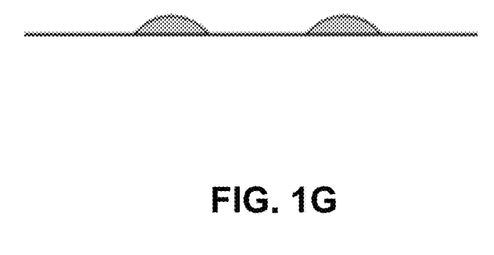
FIG. 1G is a cross section of an acoustic diaphragm having the shape of a planar surface with two ribs.
Figure 1H:
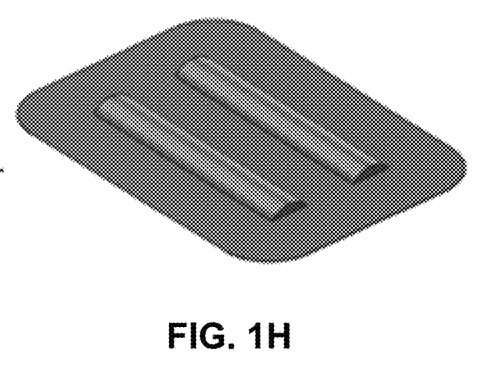
FIG. 1H is an elevation view of an acoustic diaphragm having the shape of a planar surface with two ribs.

The composite material can be shaped by a thermoforming process using die forming, pneumatic forming, vacuum forming and/or a combination thereof. This can be used to shape the composite material into a truncated cone shape, an inverted truncated cone shape, planar shape, dome shape, an inverted dome shape, a shape with a centrally domed portion surrounded by a curved edge portion, a shape with a centrally domed portion surrounded by a planar edge portion, or a shape with an upper or lower domed portion and an upper or lower cylindrical portion. It is also contemplated that ribs, striations or other small features can be added to the shapes described herein. FIGS. 1A-1H show exemplary geometries of shapes that the composite material can be made into. FIGS. 1A-1B illustrate the dome, FIGS. 1C-1D illustrate a central dome with edges, FIGS. 1E-1F illustrate a truncated cone, and FIGS. 1G-1H illustrate a planar diaphragm with two ribs.

Membranes or acoustic diaphragms made with the composite material of the present disclosure (or the composite material itself) can be characterized by a speed of sound of between 1,500 to 10,000 m/s, or between 2,500 to 7,500 m/s, and/or can be characterized by an internal loss factor of between 0.001 to 0.5 or 0.1 to 0.2. In at least some embodiments, the composite material can be characterized by having a 0-50% difference in speed of sound between machine direction and transverse direction.

Accordingly, it is presently contemplated that the composite material can be integrated in acoustic transducers, microphones and speakers. In one example, there is provided an acoustic transducer that is dynamic with an operating frequency range between 10 Hz and 100 KHz or between 10 Hz and 50 kHz, having the composite material as the material for the acoustic diaphragm. Other acoustic transducers with different frequency ranges can be made with an acoustic diaphragm made of the composite material of the present disclosure. For example, this can a dynamic tweeter with an operating frequency range between 300 Hz to 50 KHz, micro-electromechanical systems (MEMS) speaker with an operating frequency range between 10 Hz to 100 kHz, a balanced armature speaker with an operating frequency range between 10 Hz to 100 KHz.

Figure 2:
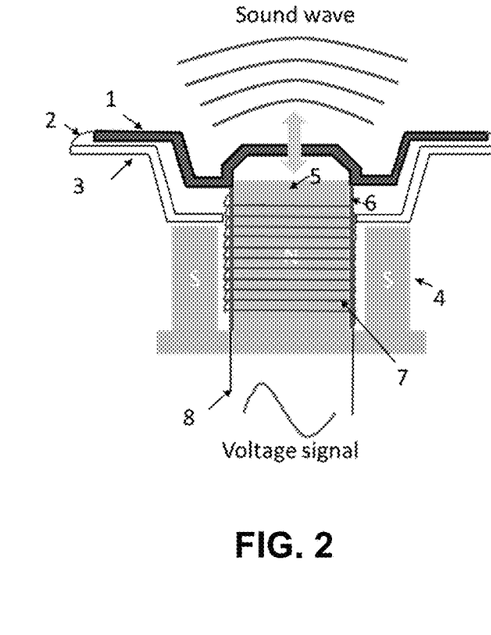
FIG. 2 is a schematic view of a speaker according to one embodiment of the present disclosure.

In one exemplary embodiment, a speaker 10 is shown in FIG. 2. In this exemplary embodiment, a membrane 1 made of the composite material of the present disclosure is supported by a surround material 2 which is itself supported by a frame 3. The speaker has a pole piece 4 (showed in the figure as the south magnetic pole) and a permanent magnet 5 (showed in the figure as the north magnetic pole). A former 6 is connected to a voice coil 7 which wraps around the permanent magnet 5. Electric leads extend from the membrane 1 down the length of the permanent magnet 5 with the voice coil 7. The electrical leads provide the electrical signal to induce vibration of the membranes and thus emit sound waves.

EXAMPLE

A composite material with 70 parts of polycarbonate (PC) resin which was premixed with or without 0.7 part of titanite based coupling agent and 30 parts of graphitic filler (graphite or reduced graphene oxide) using a Henschel high intensity mixer. The premixed powder was then transferred to a Barbender twin screw compounder and extruded at a temperature between 180° C. to 265° C. The extrudate was then granulated and the granulated pellets were then fed into a single screw extruder for film extrusion at 265° C. The extruded film was then further calendared to improve film uniformity and mechanical properties. The calendared film can optionally undergo biaxial stretching at a temperature around 150° C. for further improvement in mechanical properties. Alternatively, the resin and the filler can be kneaded around the melting temperature of the resin and can be subsequently rolled into sheets.

To make the transducer assembly, the extruded film (composite material) was thermoformed around 150° C. to a dome shape and was then laser cut. The formed film was then glued to a polyurethane surround to form a full transducer diaphragm.

TABLE 1

Composition of the composite materials tested (CA = coupling agent)

| Composite material label | Filler to resin mass ratio | Filler | Coupling agent mass ratio to filler |
|---|---|---|---|
| Composite-1 without CA | 3:7 | Graphite | 0 |
| Composite-1 with CA | 3:7 | Graphite | 3:100 |
| Composite-2 without CA | 3:7 | Reduced graphene oxide | 0 |
| Composite-3 without CA | 3:7 | Reduced graphene oxide and graphite | 0 |

Figure 3:
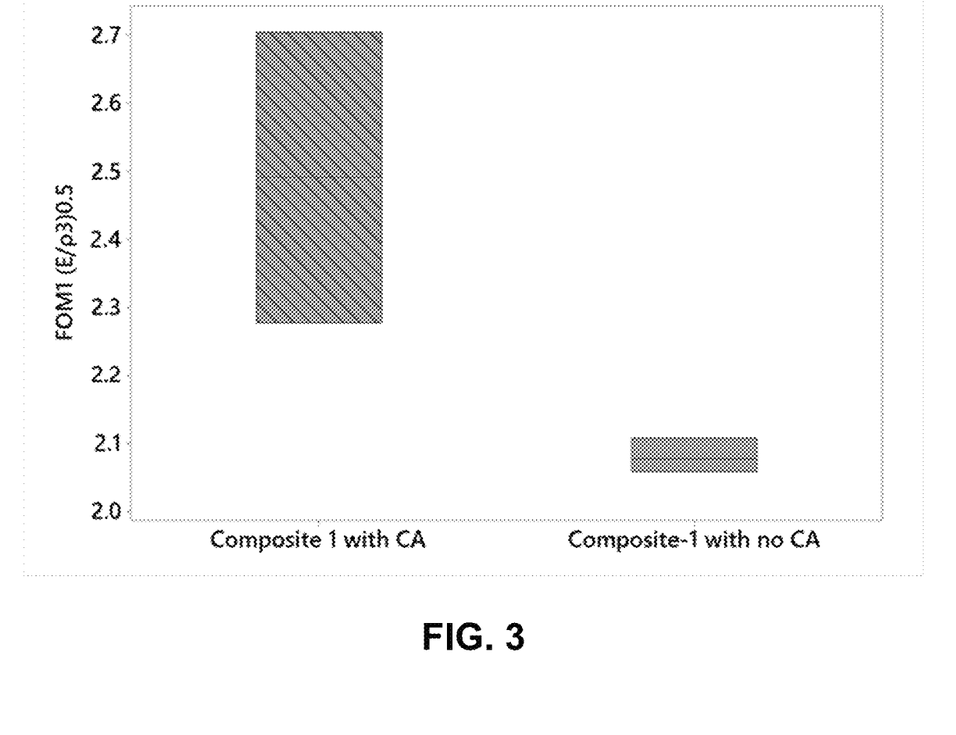
FIG. 3 is a box plot showing the comparison in FOM of acoustic diaphragms with different composite materials.
Figure 4:
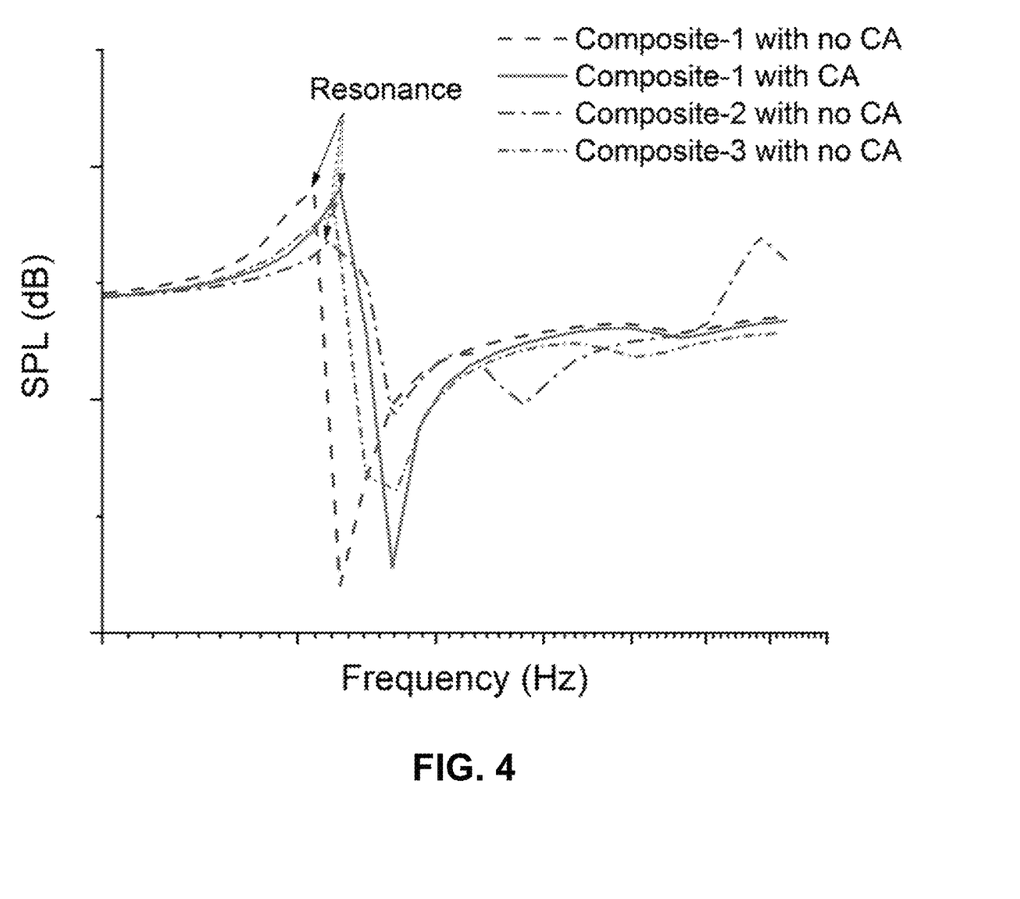
FIG. 4 is a graph showing the sound pressure level (SPL) in function of the frequency.
Figure 5:
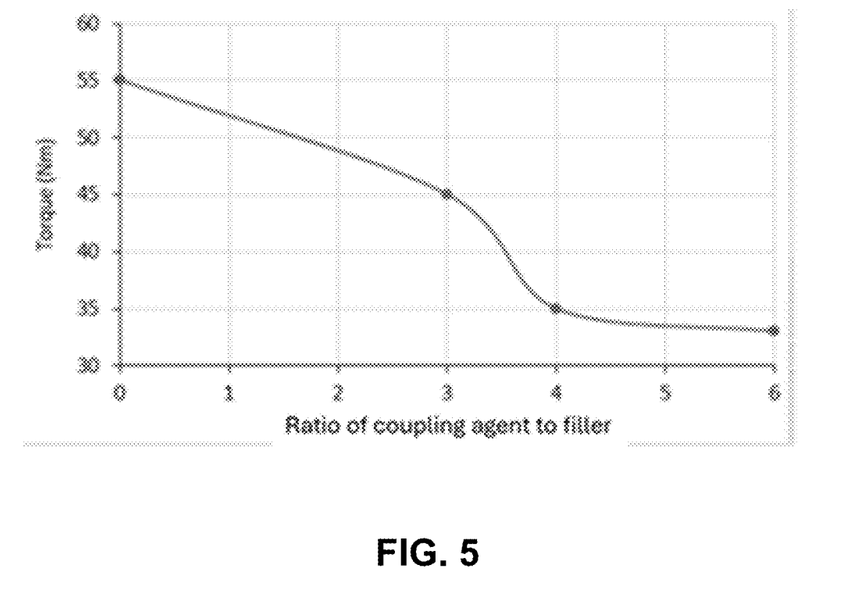
FIG. 5 is a graph showing the torque in function of the ratio of coupling agent to filler.
Figure 6:
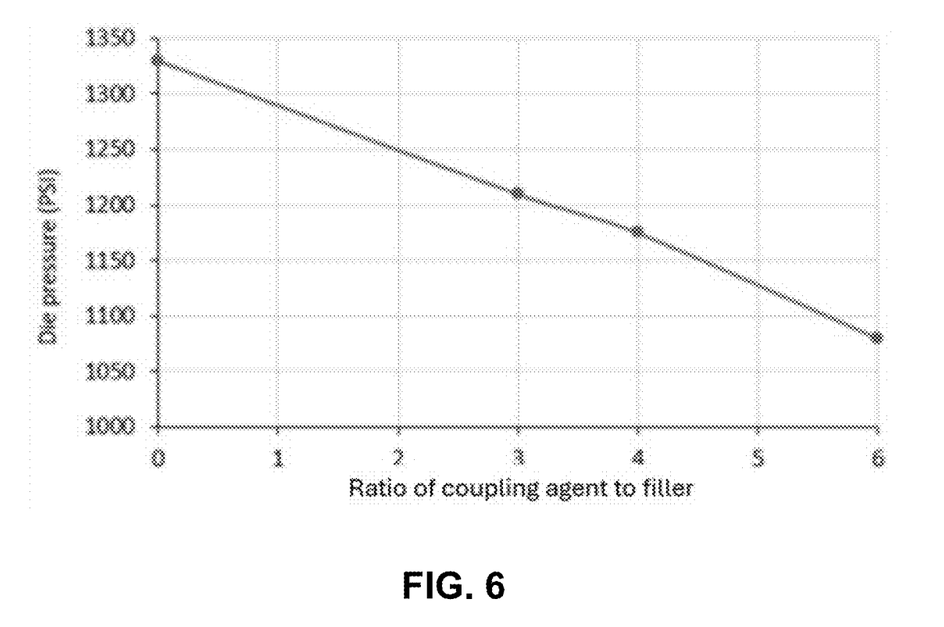
FIG. 6 is a graph showing the die pressure in function of the ratio of coupling agent to filler.

FIG. 3 shows a comparison of merit FOM (defined as $(E/\rho^3)^{1/2}$, where E is the Young's modulus of the material and p is the density of the material). The composite made with the titanium based coupling agent shows a 20% improvement in FOM compared to those without the coupling agent. FIG. 4 shows a comparison of a frequency response in the range of (1000 Hz to 4000 Hz) of headphone speakers made from different composite diaphragm materials that are equal in mass. Due to their higher FOM, the ones with coupling agents show an increase in resonance frequency and a narrower variation in SPL around the resonance frequency. Finally, FIGS. 5-6 show that a decrease in compounder torque and die pressure occurred upon adding coupling agent. This is an indication of an improvement in mixing between the filler and the polymer resin. This improvement in mixing and better compatibility between filler and resin, without wishing to be bound by theory, is the main reason for the improved acoustic response for the coupling agent added composite.

What is claimed is:

1. A composite material for an acoustic transducer diaphragm comprising:
    a thermoplastic polymer resin selected from the group consisting of polypropylene, polyethylene, poly (methyl methacrylate), polycarbonate, polyoxymethylene, cyclic olefin copolymer, polyethylene terephthalate, acrylonitrile butadiene styrene, polybutylene terephthalate, polyamide, poly(ADP-ribose) polymerase, polyethylenimine, polyamide-imide, polyether ether ketone, polyolefin, polyester, polycarbonate, polysulfone, polyacetals, polyvinyl acetals, polyketone, polyamides, cyclic olefin copolymer, thermoplastic thermotropic liquid-crystal polymer, polyphenylene sulfide, polyimide and a mixture thereof; and
    a graphitic filler selected from the group consisting of graphene oxide, reduced graphene oxide, graphite, graphene, carbon nanotubes, and any combination thereof;
    wherein the graphitic filler is provided in a weight ratio of the graphitic filler to thermoplastic resin of between 1:99 to 9:1.

2. The composite material of claim 1, further comprising a coupling agent selected from the group consisting of titanium organometallics, aluminum organometallics, zirconium organometallics, and silicon organometallics.

3. The composite material of claim 2, wherein the coupling agent is present in a concentration of at least 0.5 wt. %.

4. The composite material of claim 2, wherein the coupling agent has a chemical structure being $(R)_x\text{-}M_y\text{-}(R')_z$, wherein M is selected from silicon, titanium, aluminum, zirconium or a combination thereof, R is a filler binding functional group, R' is a resin binding functional group, and the values of x, y, and z are defined as $1 \le x \le 20$, $0 \le y \le 6$ and $1 \le z \le 20$.

5. The composite material of claim 1, further comprising additional fillers selected from the group consisting of carbon fibers, cellulose fibers, mineral clays, glass fibers and combinations thereof.

6. The composition material of claim 5, wherein the additional fillers are provided in a concentration of up to 40 wt. % of the total weight of the composite material.

7. The composite material claim 1, having a shape selected from:
- a truncated cone shape or an inverted truncated cone shape,
- a planar shape,
- a dome shape or an inverted dome shape,
- a centrally domed portion surrounded by a curved edge portion,
- a centrally domed portion surrounded by a planar edge portion, or
- an upper or lower domed portion and an upper or lower cylindrical portion.

8. The composite material of claim 1, wherein ribs or striations are present on the composite material.

9. The composite material of claim 1, having a speed of sound between 1500 m/s and 10,000 m/s and internal loss factor between 0.001 to 0.5.

10. The composite material of claim 1, having a speed of sound between 2500 m/s and 7500 m/s and internal loss factor between 0.01 to 0.2.

11. The composite material of claim 1, having a 0% to 50% difference in speed of sound between machine direction and transverse direction.

12. A method of forming the composite material as defined in claim 1 into a predetermined shape selected from the shape as defined in claim 1, the method comprising thermoforming the composite material into the predetermined shape.

13. The method of claim 12, wherein the thermoforming is die forming, pneumatic forming, vacuum forming and/or a combination thereof.

14. A loudspeaker comprising the composite material as defined in claim 1.

15. The loudspeaker of claim 10, being dynamic with an operating frequency range between 10 Hz to 50 KHz.

16. The loudspeaker of claim 10, wherein the loudspeaker is a dynamic tweeter with an operating frequency range between 300 Hz to 50 KHz.

17. The loudspeaker of claim 10, wherein the loudspeaker is a MEMS speaker with an operating frequency range between 10 Hz to 100 KHz.

18. The loudspeaker of claim 10, wherein the loudspeaker is a balanced armature speaker with an operating frequency range between 10 Hz to 100 KHz.

19. The loudspeaker of claim 10, being electrostatic with an operating frequency range between 10 Hz to 100 KHz.

* * * * *